United States Patent
Hirano et al.

(10) Patent No.: US 8,363,620 B2
(45) Date of Patent: Jan. 29, 2013

(54) CONNECTION STATE REPORTING METHOD AND MOBILE TERMINAL USED IN THE METHOD

(75) Inventors: Jun Hirano, Kanagawa (JP); Tien Ming Benjamin Koh, Singapore (SG); Chan Wah Ng, Singapore (SG); Chun Keong Benjamin Lim, Singapore (SG); Mohana Dhamayanthi Jeyatharan, Singapore (SG)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 12/740,625

(22) PCT Filed: Oct. 29, 2008

(86) PCT No.: PCT/JP2008/003101
§ 371 (c)(1),
(2), (4) Date: Apr. 29, 2010

(87) PCT Pub. No.: WO2009/060572
PCT Pub. Date: May 14, 2009

(65) Prior Publication Data
US 2010/0309880 A1 Dec. 9, 2010

(30) Foreign Application Priority Data
Nov. 6, 2007 (JP) ................................. 2007-288721

(51) Int. Cl.
H04W 4/00 (2009.01)
H04L 12/26 (2006.01)
H04L 12/44 (2006.01)
H04L 12/56 (2006.01)

(52) U.S. Cl. .................. 370/331; 370/395.32; 370/401; 370/408; 370/420; 709/201; 709/231; 709/252

(58) Field of Classification Search .......... 370/311–463; 709/201–252; 455/436
See application file for complete search history.

(56) References Cited

U.S. PATENT DOCUMENTS 6,850,524 B1 * 2/2005 Troxel et al. ............. 370/395.32
(Continued)

FOREIGN PATENT DOCUMENTS

JP 2001-189949 7/2001
JP 2004-40461 2/2004
(Continued)

Primary Examiner — Afsar Qureshi
(74) Attorney, Agent, or Firm — Dickinson Wright PLLC

(57) ABSTRACT

A technology is disclosed for providing a connection status notifying method and the like that can infer that a new connection will become usable shortly based on a predetermined action, and give notification thereof. The technology includes a step at which a mobile node 1000 receives information stating that connection will be broken from a base station that is a current connection destination, a step at which the mobile node starts a predetermined process with a base station that is a new connection destination, and a step at which the mobile node generates a predetermined notification message and transmits the generated predetermined notification message when the predetermined process is judged to be completed, the predetermined notification message being used to give notification to a predetermined component part within the mobile node or to another communication node that a connected state is established with the base station of the new connection destination at an early stage.

28 Claims, 4 Drawing Sheets

U.S. PATENT DOCUMENTS

| | | |
|---|---|---|
| 2001/0005677 A1 | 6/2001 | Dempo |
| 2003/0225883 A1 | 12/2003 | Greaves |
| 2005/0076104 A1* | 4/2005 | Liskov et al. ............... 709/223 |
| 2005/0166117 A1 | 7/2005 | Suwa |
| 2005/0197908 A1* | 9/2005 | Asami ............................ 705/26 |
| 2010/0115079 A1* | 5/2010 | Sakoda et al. ............... 709/223 |

FOREIGN PATENT DOCUMENTS

| | | |
|---|---|---|
| JP | 2004-304436 | 10/2004 |
| JP | 2005/167460 | 6/2005 |
| JP | 2007-104496 | 4/2007 |
| JP | 2007-274658 | 10/2007 |

* cited by examiner

CONNECTION STATE REPORTING METHOD AND MOBILE TERMINAL USED IN THE METHOD

TECHNICAL FIELD

The present invention relates to the field of telecommunication networks. In particular, the present invention relates to a connection status notifying method and a mobile node used by the method, in which notification is given of a connection status that changes as a result of disconnection from a data network and reconnection to a data network being repeatedly performed.

BACKGROUND ART

Internet connectivity is vital to roaming users of recent years. The roaming users desire constant connection, even during roaming. As a result of popularization of wireless Local Area Network (LAN) hot spots and other next generation wireless technologies, such as Worldwide interoperability for Microwave Access (WiMAX), cities are covered with different, overlapping wireless network areas. Therefore, when a user passes through these different overlapping networks, a user node is repeatedly connected and disconnected. Frequent changes in connection and disconnection degrade user experience (user-friendliness). For example, in an instant messaging application, a communication partner in a user's contact list receives frequent notifications of changes in the user's status. A simple file transfer performed between the user and the communication partner is frequently interrupted because of loss of connection. If a download resuming function is not supported, a file is required to be downloaded from the beginning.

When the problem is divided, first, a length of disconnection should be predicted. As a known technique, "link going up" and "link going down" triggers are known. The former indicates that a link will become usable. The latter indicates an amount of time until the link will become unusable. To predict when connection or disconnection will occur, the "link going up" and "link going down" triggers require physical judgment criteria unique to the wireless signal to be actually obtained (refer to Patent Document 1, below). There is a solution method in which data traffic can be routed through use of a method that takes into consideration changes over time, using such prediction (refer to Patent Document 2, below). However, the method using "link going up" and "link going down" is problematic in that, to carry out the function, a mobile node (MN) is required to be physically close to a point of attachment (PoA).

Another approach is to add a lifetime (duration period) to the status. As an example of this approach, binding update (BU) in mobile IP and zero reservation quality of service (QoS) signaling are known. The BU adds a lifetime indicating that the binding is valid. In effect, the binding is maintained during the period of this lifetime even when the node is temporarily disconnected from the network. The zero reservation QoS signaling does not actually reserve resources when the mobile node is temporarily unusable. However, a signaling path that has been set up is saved until the time limit. However, a method such as this faces a problem in that it is unclear how long the mobile node or communication partner node will be disconnected, and approximately when the mobile node or communication partner node will become usable again.

Patent Document 1: Greaves, Jon, Darren; Hughes, Paul; Ma, Chun, Chau; Seminaro, Michael, "System and method for reliable delivery of event information", US Patent Application Publication No. 20030225883 A1, Dec. 4, 2003

Patent Document 2: Troxel, Gregory Donald; Wiggins, David Paul, "Systems and methods for predictive routing", U.S. Pat. No. 6,850,524 B1, Feb. 1, 2005

In this way, currently, there is a problem in that a method does not exist to allow the mobile node to know the length of connection loss (non-connected period). There is a document claiming a method in which judgment is made from a wireless strength of a signal detected by the PoA. However, the method is limited in that the method can be used only when the mobile node is within the range of the PoA. The user cannot know when disconnection occurs whether the loss will be short and temporary or will be for a long amount of time. If the amount of time can be predicted, an algorithm for managing power can be efficiently used. A route more advantageous for the user may be able to be decided. In the specification of IEEE 802.21 that is a standardization of this field, notification of when a connection is lost is permitted. However, no hints are provided as to when the connection will be reestablished.

DISCLOSURE OF THE INVENTION

The present invention has been achieved in light of the above-described issues. An object of the present invention is to provide a connection status notifying method and a mobile node used by the method, in which an inference can be made that a new connection will become usable shortly based on a predetermined action, and a notification can be given thereof.

To achieve the above-described object, the present invention provides a connection status notifying method of giving notification of information related to an establishment of a connected state between a mobile node and a base station that is a new connection destination of the mobile node. The connection status notifying method includes a step at which the mobile node receives information stating that a connection with a base station that is a current connection destination will be broken. The connection status notifying method also includes a step at which the mobile node starts a predetermined process with the base station that is the new connection destination. The connection status notifying method also includes a step at which the mobile node generates a predetermined notification message and transmits the generated notification message when the predetermined process is judged to be completed. The predetermined notification message is used to give notification to a predetermined component part within the mobile node or to another communication device that a connected state is established with the base station of the new connection destination. As a result of the configuration, inference can be made that a new connection will become usable shortly based on a predetermined action, and notification can be given thereof.

In addition, in the connection status notifying method of the present invention, a preferred aspect of the present invention is that the predetermined process is at least one of a pre-authentication procedure that is a security association between the mobile node and the base station of the new connection destination, a quality of service resource reservation, and an imminent handover signaling. As a result of the configuration, the predetermined process can serve as a trigger for generating the predetermined notification message.

In addition, in the connection status notifying method of the present invention, a preferred aspect of the present invention is that the predetermined notification message includes message identifying information and identifying information of the mobile node. As a result of the configuration, which mobile terminal the message is from can be identified.

In addition, in the connection status notifying method of the present invention, a preferred aspect of the present invention is that the predetermined notification message includes at least one of identifying information of the base station of the new connection destination and option information. As a result of the configuration, a new connection destination and the like can be known.

In addition, in the connection status notifying method of the present invention, a preferred aspect of the present invention is that the option information includes at least one of information on an amount of time until reconnection, and a reason code indicating a reason for which inference is made that a next connection will be made. As a result of the configuration, the amount of time required until reconnection and the reason inference regarding the next connection is made can be known.

In addition, in the connection status notifying method of the present invention, a preferred aspect of the present invention is that the reason code includes at least one of a reason code giving performance of a pre-authentication procedure as a reason, a reason code giving performance of a quality-of-service resource reservation as a reason, and a reason code giving start of a handoff procedure as a reason. As a result of the configuration, a specific reason for which inference is made can be known.

In addition, in the connection status notifying method of the present invention, a preferred aspect of the present invention is that the other communication device is at least one of a communication partner node of the mobile node, an instant messaging server, an authentication, authorization, and accounting server, and a paging controller. As a result of the configuration, various processes can be performed depending on the type of the external node.

In addition, in the connection status notifying method of the present invention, a preferred aspect of the present invention is that the instant messaging server, the authentication, authorization, and accounting server, and the paging controller send the predetermined notification message to another node. As a result of the configuration, appropriate routing of the message can be performed.

In addition, in the connection status notifying method of the present invention, a preferred aspect of the present invention is that the mobile node has a processing unit that processes the predetermined notification message. As a result of the configuration, notification can be given that the next connection can be made in a short amount of time.

In addition, in the connection status notifying method of the present invention, a preferred aspect of the present invention is that the processing unit is mounted using a Media Independent Handover Function of IEEE 802.21. As a result of the configuration, the predetermined notification message can be defined by the Media Independent Handover Function of IEEE 802.21.

In addition, in the connection status notifying method of the present invention, a preferred aspect of the present invention is that the processing unit includes at least one of a handover function, a security function, and a quality-of-service function. As a result of the configuration, processes can be performed based on each function.

In addition, in the connection status notifying method of the present invention, a preferred aspect of the present invention is that the imminent handover signaling is mounted using a MIN_MN_MO_Commit primitive of IEEE 802.21 or a MIN_Net_MO_Commit primitive of IEEE 802.21. As a result of the configuration, these primitives can be used as a trigger when the predetermined notification message is transmitted.

In addition, in the connection status notifying method of the present invention, a preferred aspect of the present invention is that the predetermined notification message is transmitted via a different interface of the mobile node. As a result of the configuration, the predetermined notification message can be transmitted even when the predetermined notification message cannot be transmitted from a certain interface.

In addition, in the connection status notifying method of the present invention, a preferred aspect of the present invention is that the predetermined notification message is used for at least one of power management, connection and disconnection management, notification of connection to other nodes, and filter rule management. As a result of the configuration, the predetermined management can be efficiently performed by the receiving side of the predetermined notification message.

The present invention provides a mobile node that is a mobile node used in a connection status notifying method of giving notification of information related to an establishment of a connected state between the mobile node and a base station that is a new connection destination of the mobile node. The mobile node includes a receiving means for receiving information stating that a connection with a base station that is a current connection destination will be broken. The mobile node also includes a processing means for starting a predetermined process between the mobile node itself and the base station that is the new connection destination. The mobile node also includes a message generating means for generating a predetermined notification message when the predetermined process is judged to be completed. The predetermined notification massage is used to give notification to a predetermined component part within the mobile node or to another communication device that a connected state is established between the mobile node itself and the base station of the new connection destination. The mobile node also includes a transmitting means for transmitting the generated predetermined notification message. As a result of the configuration, inference can be made that a new connection will become usable shortly based on a predetermined action, and notification can be given thereof.

In addition, in the mobile node of the present invention, a preferred aspect of the present invention is that the predetermined process is at least one of a pre-authentication procedure that is a security association between the mobile node and the base station of the new connection destination, a quality-of-service resource reservation, and an imminent handover signaling. As a result of the configuration, the predetermined process can serve as a trigger for generating the predetermined notification message.

In addition, in the mobile node of the present invention, a preferred aspect of the present invention is that the predetermined notification message includes message identifying information and identifying information of the mobile terminal. As a result of the configuration, which mobile terminal the message is from can be identified.

In addition, in the mobile node of the present invention, a preferred aspect of the present invention is that the predetermined notification message includes at least one of identifying information of the base station that is the new connection destination and option information. As a result of the configuration, a new connection destination and the like can be known.

In addition, in the mobile node of the present invention, a preferred aspect of the present invention is that the option information includes at least one of information on an amount of time until reconnection, and a reason code indicating a reason for which inference is made that a next connection will be made. As a result of the configuration, the amount of time required until reconnection and the reason inference regarding the next connection is made can be known.

In addition, in the mobile node of the present invention, a preferred aspect of the present invention is that the reason code includes at least one of a reason code giving performance of a pre-authentication procedure as a reason, a reason code giving performance of a quality-of-service resource reservation as a reason, and a reason code giving start of a handoff procedure as a reason. As a result of the configuration, a specific reason for which inference is made can be known.

In addition, in the mobile node of the present invention, a preferred aspect of the present invention is that the other communication device is at least one of a communication partner node of the mobile node, an instant messaging server, an authentication, authorization, and accounting server, and a paging controller. As a result of the configuration, various processes can be performed depending on the type of the external node.

In addition, in the mobile node of the present invention, a preferred aspect of the present invention is that the instant messaging server, the authentication, authorization, and accounting server, and the paging controller send the predetermined notification message to another node. As a result of the configuration, appropriate routing of the message can be performed.

In addition, in the mobile node of the present invention, a preferred aspect of the present invention is that the processing means processes the predetermined notification message. As a result of the configuration, notification can be given that the next connection can be made in a short amount of time.

In addition, in the mobile node of the present invention, a preferred aspect of the present invention is that the processing means is mounted using a Media Independent Handover Function of IEEE 802.21. As a result of the configuration, the predetermined notification message can be defined by the Media Independent Handover Function of IEEE 802.21.

In addition, in the mobile node of the present invention, a preferred aspect of the present invention is that the processing means includes at least one of a handover function, a security function, and a quality-of-service function. As a result of the configuration, processes can be performed based on each function.

In addition, in the mobile node of the present invention, a preferred aspect of the present invention is that the imminent handover signaling is mounted using a MIN_MN_MO_Commit primitive of IEEE 802.21 or a MIN_Net_MO_Commit primitive of IEEE 802.21. As a result of the configuration, these primitives can be used as a trigger when the predetermined notification message is transmitted.

In addition, in the mobile node of the present invention, a preferred aspect of the present invention is that the predetermined notification message is transmitted via a different interface of the mobile node. As a result of the configuration, the predetermined notification message can be transmitted even when the predetermined notification message cannot be transmitted from a certain interface.

In addition, in the mobile node of the present invention, a preferred aspect of the present invention is that the predetermined notification message is used for at least one of power management, connection and disconnection management, notification of connection to other nodes, and filter rule management. As a result of the configuration, the predetermined management can be efficiently performed by the receiving side of the predetermined notification message.

The connection status notifying method and the mobile node used in the method of the present invention can infer that a new connection will become usable shortly based on a predetermined action, and give notification thereof.

BEST MODE FOR CARRYING OUT THE INVENTION

First Embodiment

Numerical values, time, structures, parameters, and the like used to explain each embodiment below are given to facilitate understanding of the present invention. The present invention is not limited thereto.

The present invention can be used when a mobile node moves about in a communicable area interspersed with networks. Because of the lack of an inclusive network range, and frequent occurrences of hand-offs and disconnections, it is useful for a mobile node and a communication partner node to know whether connection will be restored within a short amount of time. Knowledge that the connection will be restored within a short amount of time is particularly useful when, for example, an instant messaging application can indicate "be right back" or "currently unavailable, but will be connected shortly" instead of a "disconnected" status. As a result, the communication partner can know that the chat session can be continued.

In another usages case, if the mobile node or the communication partner node knows that the disconnection is only for a short amount of time, transfer protocol temporarily stops a communication control algorithm because the connection will be restored shortly. In other applications, when a link cannot be immediately used, the mobile node can set a virtual interface during a long period in power-saving mode. Taking into consideration such advantages, the present invention provides an Upcoming link event trigger, and a method and a device related to the usage thereof. A person skilled in the art can recognize from the contents disclosed in the embodiments of the present invention that, compared to Link Going Up in the conventional technology, Upcoming Link event can provide an early indication of an imminent connection by timing information.

Figure 1:
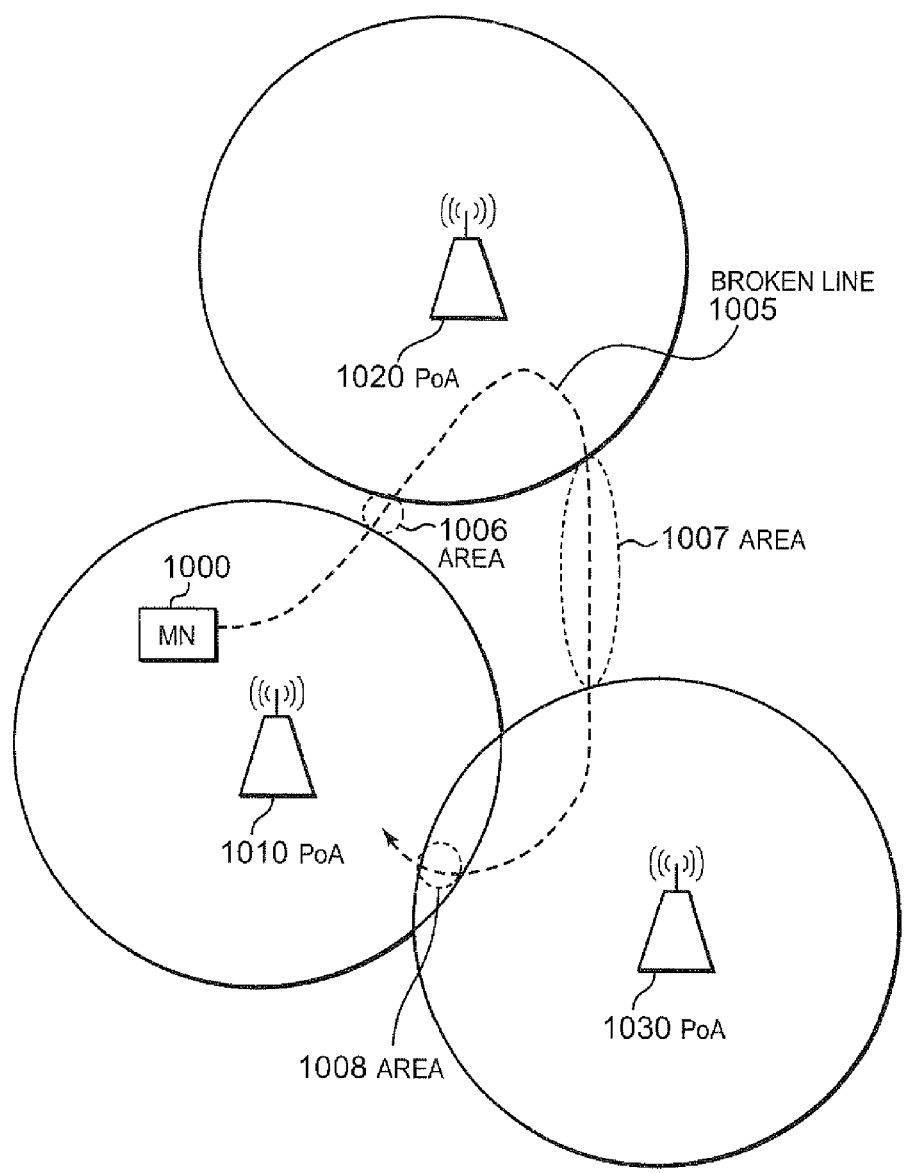
FIG. 1 is a schematic diagram of an example of a configuration of a communication network according to first to ninth embodiments of the present invention.

An example of a configuration of a communication network according to a first embodiment is shown in FIG. 1 to describe an operation of the present invention. An MN 1000 is currently connected to a PoA 1010. A broken line 1005 indicates a path over which the MN 1000 moves. Before reconnecting with the PoA 1010, the MN 1000 connects with a PoA 1020 and a PoA 1030. It is assumed that the MN 1000 can decide the next PoA (or a next PoA candidate) to which to connect.

Various methods can be used to decide the next PoA to which to connect. One possible method uses Information Service such as that provided by IEEE 802.21 technology. In the method, the MN 1000 inquires an Information Service server of IEEE 802.21 whether a possible candidate for a handover destination is present. The Information Service server gives notification of one or more possible candidates in list form. As another possible method, when the path of the MN 1000 is decided in advance, such as on a public transportation route like a bus, can be considered. However, because of factors such as traffic and the number of passengers, the arrival time at each PoA is uncertain.

Here, the MN 1000 is at a point immediately before entering an area 1006, shown in FIG. 1. When IEEE 802.21 or a similar technology is used, the MN 1000 receives a Link_Going_Down event giving notification that the link with the PoA will be disconnected. The notification of the event is given as a result of a wireless signal strength (such as power) weakening as the MN 1000 approaches the edge of the area covered by the PoA 1010. The MN 1000 makes a Query to the Information Service server and receives notification of PoA 1020 as a possible candidate for the handover destination. As a result, the MN 1000 starts a proactive action handover.

An example of a proactive action is a security procedure, such as pre-authentication. Pre-authentication refers to establishing a security association between the MN 1000 and the PoA 1020 before the MN 1000 enters the physical range of the PoA 1020. The security association is established using the connection present between the PoA 1010 and the MN 1000. As a result of the above-described method being used, an inference is made from a proactive process that a new link connection will be possible shortly. The proactive action serves as a trigger for the Upcoming_Link notification message (also simply referred to, hereinafter, as an Upcoming_Link notification). The MN 1000 generates the Upcoming_Link notification and transmits the generated Upcoming_Link notification to related locations.

Figure 2:
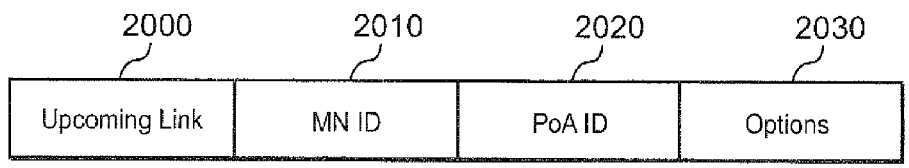
FIG. 2 is a diagram of an example of a format of an Upcoming_Link notification message according to the first to ninth embodiments of the present invention.

An example of the Upcoming_Link notification message is shown in FIG. 2. An "Upcoming_Link" field 2000 informs a receiving side that the message is an Upcoming Link message. An "MN ID" field 2010 includes identifying information (ID) of the mobile node related to the Upcoming_Link event. A "PoA ID" field 2020 is an option field including identifying information (ID) of the PoA to which the mobile node indicated in "MN ID" field 2010 connects next. An "Options" field 2030 includes a parameter of another option providing further information related to the Upcoming_Link notification. For example, the parameter is a time value indicating an amount of time required until a next connection is established.

The Upcoming_Link notification is transmitted externally towards another node, such as another communication device. Alternatively, the Upcoming_Link notification is used to notify a constituent element or an application that is internally related. As a result of the knowledge being held regarding whether the next connection will be established shortly, decisions regarding whether to reduce power in the interface, whether to remove an established connection, whether to give notification to another related node, and the like can be made appropriately and promptly by a related means.

Figure 3:
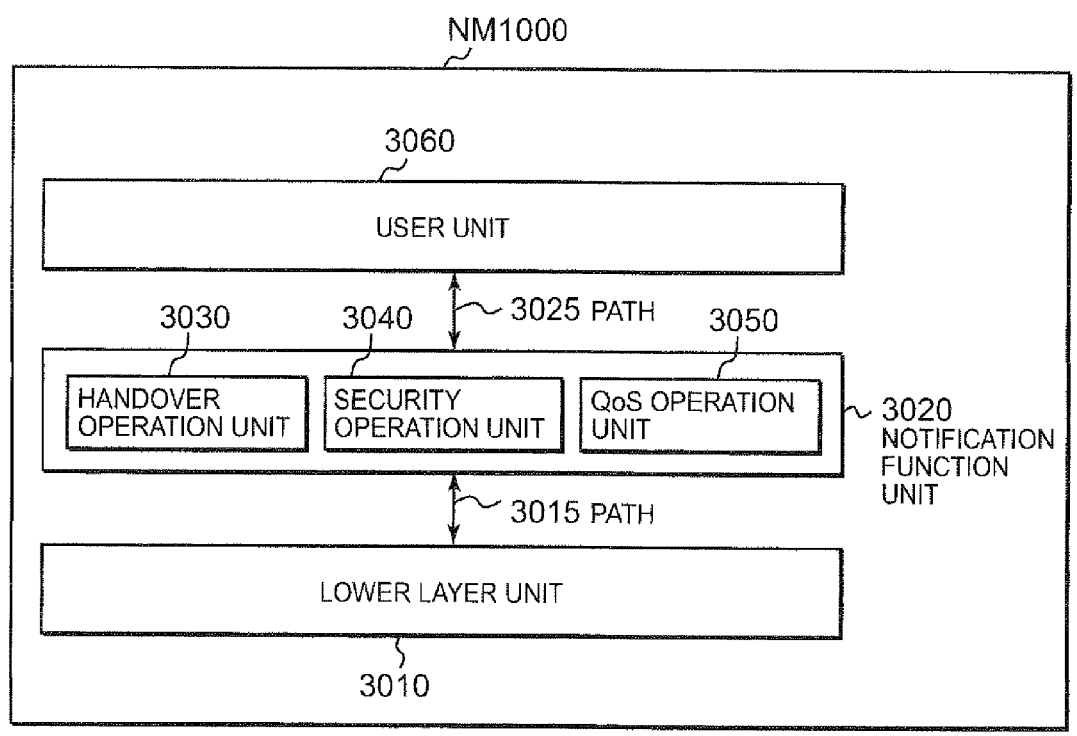
FIG. 3 is a schematic diagram of an example of a configuration of a mobile node according to the first to ninth embodiments of the present invention.

FIG. 3 is a schematic diagram of an example of a configuration of the mobile node used in the method of solution described above. A notification function unit 3020 includes various functions achieving the above-described embodiment. A user unit 3060 is involved with reception notification of the Upcoming_Link event within the mobile node. The user unit 3060 includes an application, such as an instant messaging program, a station management unit, another protocol stack such as TCP, and the like. The user unit 3060 registers the received Upcoming_Link notification n or performs access related to the Upcoming_Link notification (presence thereof), via a path 3025. A lower layer unit 3010 aggregates a single network access device or a plurality of network access devices. The notification function unit 3020 uses a path 3015 to receive or transmit messages and notifications to and from another node in the network or the lower layer unit 3010.

As an example, the user unit 3060 (as required by each function) is registered to the notification function unit 3020 to receive the Upcoming_Link notification (requests that a trigger be sent). As shown in FIG. 1, the MN 1000 is approaching the area 10006. As a result of a trigger event, such as receiving a Link_Going_Down event defined by IEEE 802.21, the notification function unit 3020 realizes that the connection is down. At this time, the notification function unit 3020 inquires the local or remote Information Service server about a candidate PoA. When the MN 1000 receives information related to the PoA 1020 as the candidate for the handover destination, the MN 1000 decides to perform the pre-authentication security association with the PoA 1020. The decision is executed as a portion of a security function provided by the notification function unit 3020 including a security operation unit 3040. When the pre-authentication procedure is successful, the notification function unit 3020 generates the Upcoming_Link notification and transmits the generated Upcoming_Link notification to the user unit 3060.

When the MN 1000 continues to move about along the broken line 1005, the MN 1000 approaches a disconnected area 1007. At this point, the MN 1000 receives the Link_Going_Down event via the lower layer unit 3010. However, the Information Service server discloses that a candidate PoA is not present in the vicinity. As a result, the Upcoming_Link notification is not transmitted to the user unit 3060. The user unit 3060, such as the station management unit, can decide to place the related network access interface in power-saving mode or in sleep mode during the long period in which the connection is not established, so as not to waste power, as a result of the Upcoming_Link notification not being received.

After connection to the PoA 1030, when the network transmits a signal stating that an imminent handover is present, the MN 1000 approaches an area 1008. This function is managed by the handover operation unit 3030 of the notification function unit 3020. The notification function unit 3020 infers that a connection is imminent and transmits the Upcoming_Link notification to the registered user unit 3060.

A QoS operation unit 3050 manages various events and commands used in QoS-related signaling. For example, the QoS operation unit 3050 manages QoS resource reservation at the candidate PoA. The notification function unit 3020 also performs processing operations using the QoS operation unit 3050 when the notification function unit 3020 infers that a next connection is made.

Figure 4:
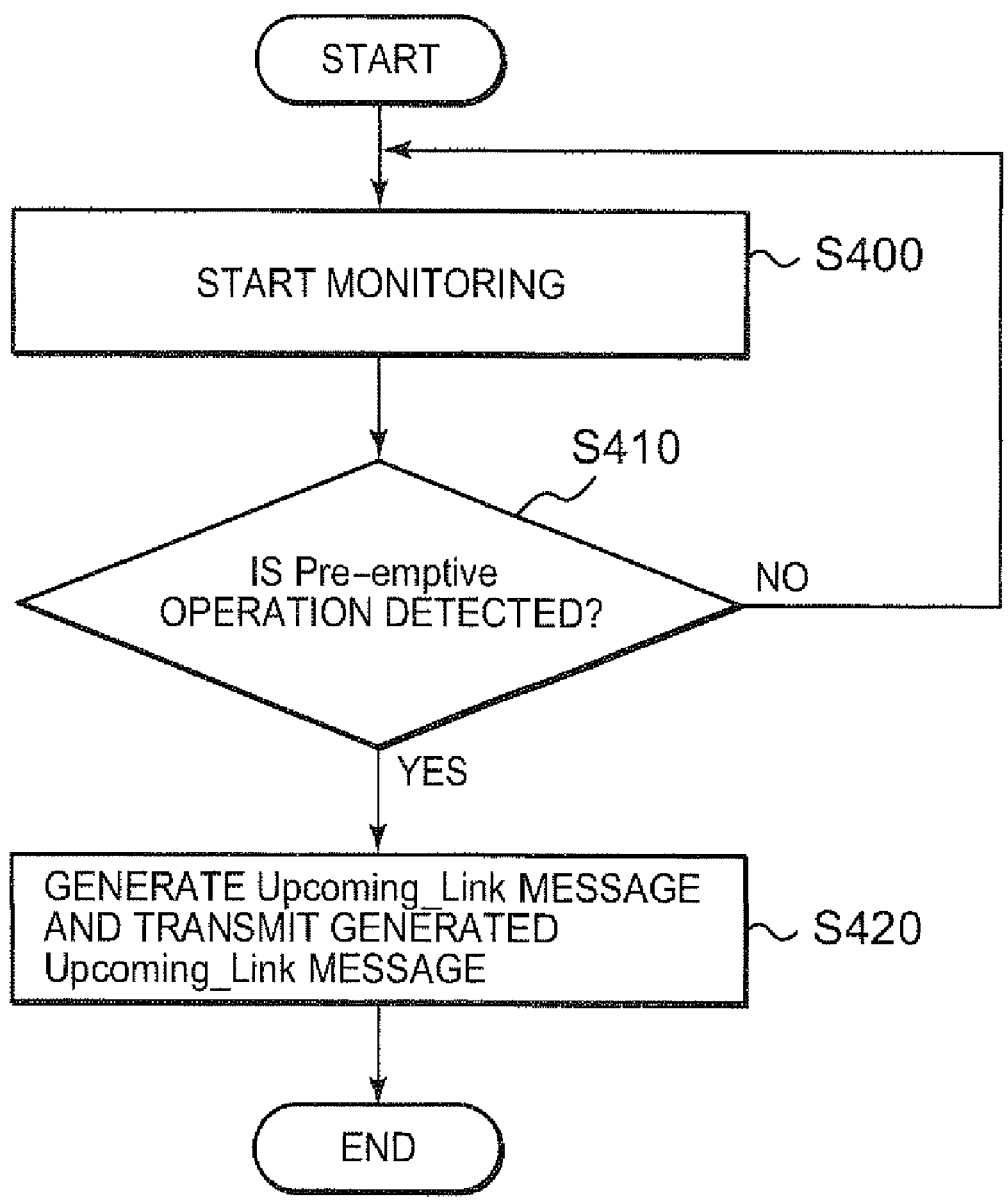
FIG. 4 is a flowchart explaining an example of operations performed by the mobile node according to the first to ninth embodiments of the present invention.

Here, an example of a flowchart for explaining the operation of the mobile node is shown in FIG. 4. The MN 1000 starts monitoring communication with another node simultaneously with internal operations (Step S400). The MN 100 judges whether a Pre-emptive operation is detected (Step S410). When the Pre-emptive operation is detected, the MN 1000 generates the Upcoming_Link notification and transmits the generated Upcoming_Link notification to a related processing block or node (Step S420). Here, the pre-emptive operation includes various messages, responses, actions, and the like obtained by the mobile node that can allow the notification function unit 3020 to infer that the connection is imminent. The Pre-emptive operation includes the above-described pre-authentication, QoS resource reservation, and instructions outputted by the network in preparation for a handoff. Other examples of the Pre-emptive operation include a selection being made to turn ON the interface, and detection of a beacon from a new PoA, However, in these instances, more strongly related the event is to the operation of the lower layer, the closer the timing is to the timing at which the Link_Going_Up event is received. Therefore, the effect (faster processing) is reduced.

Figure 5:
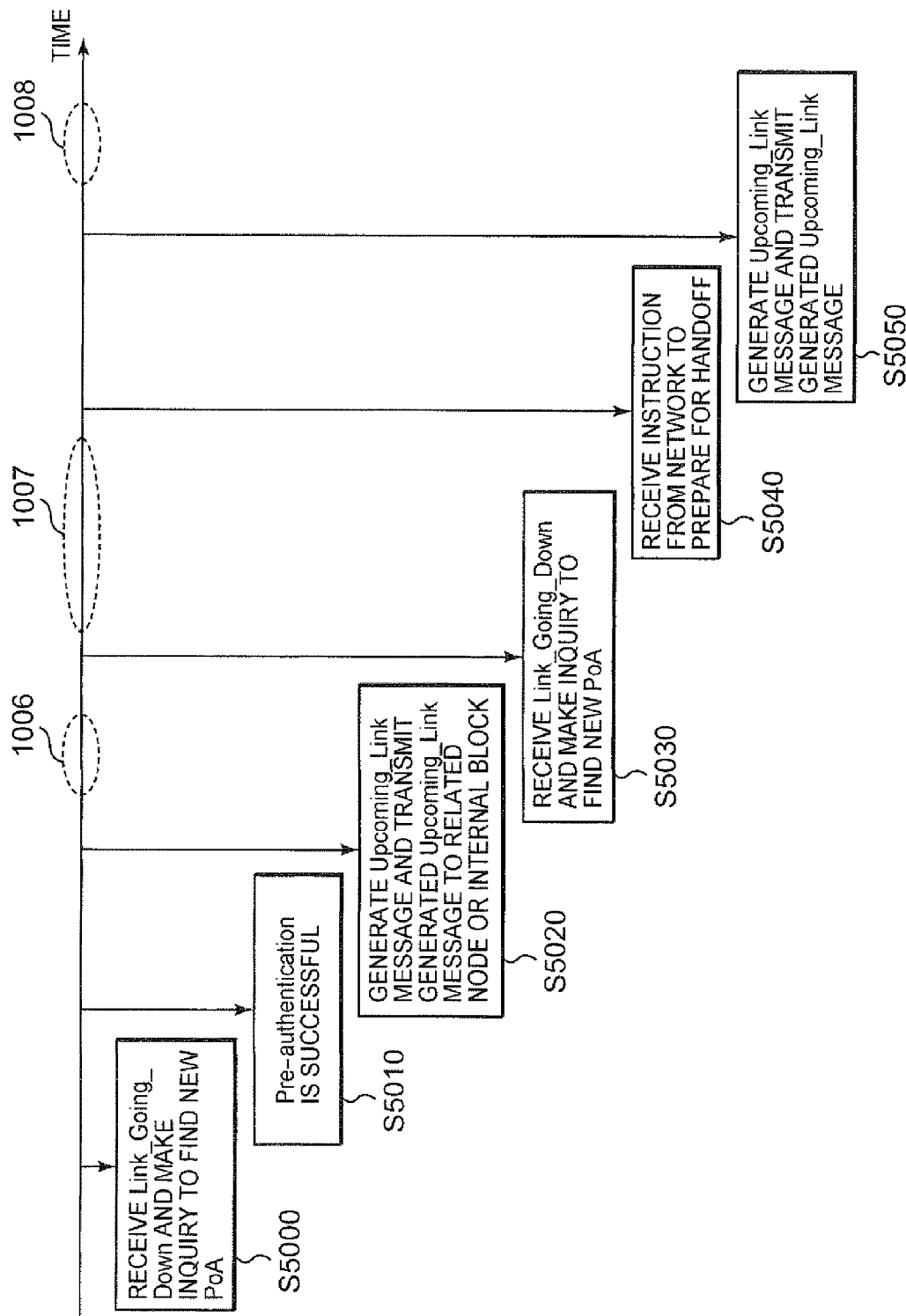
FIG. 5 is a sequence chart of an example of events caused by movement of the mobile node according to the first to ninth embodiments of the present invention.

An example of a sequence chart of events caused by movement of the MN 1000 is shown in FIG. 5. When the MN 1000 approaches the area 1006 (see FIG. 1), the MN 1000 receives the Link_Going_Down and makes an inquiry (Query) to find a new PoA (S5000). After a suitable PoA (PoA 1020) is found, the MN 1000 starts a pre-authentication procedure, for example, and is successful (S5010). The MN 1000 generates the Upcoming_Link notification and transmits the generated Upcoming_Link notification to a related node or internal block (S5020). When the MN 1000 arrives at the PoA 1020 and moves to the edge of the area of the PoA 1020 (near side of the area 1007 in FIG. 1), the MN 100 receives the Link_Going_Down and makes an inquiry to find a new PoA (S5030).

In this instance, the pre-authentication procedure is unsuccessful (the pre-authentication procedure itself may not be performed because a suitable PoA is not present). Therefore, because the Upcoming_Link notification is not given, related sections take appropriate actions. For example, because a long amount of time is required until reconnection, a mobile node power management unit decides to place the interface in power-saving mode. The MN 1000 connects to the PoA 1030 and moves again to the edge of the network area (near side of the area 1008 in FIG. 1). At this time, the MN 1000 receives an instruction from the network to prepare for a handoff to the PoA 1010 (S5040). The MN 1000 infers that the instruction is a Pre-emptive procedure. The MN 1000 generates the Upcoming_Link notification and transmits the generated Upcoming_Link notification (S5050). However, when the related node is present externally, a notification means is required to be present, such as a method of using another interface, as described hereafter.

Second Embodiment

According to another preferred embodiment, the Upcoming_Link notification can be given to the user unit 3060 disposed outside of the mobile node (such as a user unit within a device of a communication partner node). This scenario is particularly useful when the MN 1000 is communicating with another node when disconnection is about to occur. Using the above-described method of solution, the MN 1000 transmits the Upcoming_Link notification to the communication partner node to inform the communication partner node that the disconnection is short and temporary. The communication partner node maintains a state in which a communication port is opened (connected state). However, the communication partner node takes actions corresponding to a transmission delay of a packet to the MN 1000. For example, in a central server in an instant messaging service, the user unit 3060 relays to another related client that "disconnected, but will be reconnected shortly".

Third Embodiment

According to another preferred embodiment, the Upcoming_Link notification is given to an Authentication, Authorization, and Accounting (AAA) server. In this instance, the pre-authentication procedure is simultaneously performed. The AAA server updates information on other network nodes to perform an accurate routing of a message. As a usage scenario, the mobile node performs a pre-authentication with the AAA server over a remote network. After a successful authentication, the AAA server updates a router related to a next connection with the mobile node or another related AAA server.

Fourth Embodiment

According to another preferred embodiment, the Upcoming_Link notification is given to a paging controller belonging to a candidate PoA network. According to the embodiment, this is performed when a paging related to a "sleeping" interface is received via an interface that is currently connected. The paging controller updates another network node to perform an accurate routing of the message. As a scenario, when the paging controller receives a request made to the mobile node can be considered. As a result of a record indicating connection of the mobile node to another network being checked, the paging controller can decide to page the mobile node from an available, connected network interface. At the same time, in place of the mobile node, the paging controller starts (transfers) the Upcoming_Link notification to another related node such that preparatory actions (such as resource reservation) can be taken.

Fifth Embodiment

According to another preferred embodiment, the Upcoming_Link notification is transmitted via another interface belonging to the MN 1000 having an active connection. This is useful when inference of the next connection is completed after connection has been lost in the first interface. As a scenario, when the mobile node has lost a broad-band wireless connection but can use an expensive, low-band cellular link can be considered. Using information related to the next connection from an extracted beacon, an Information service report using a cellular interface, and the like, the mobile node transmits the Upcoming_Link notification to a related application server (such as instant messaging and Voice-over IP) using the cellular interface.

Sixth Embodiment

According to another preferred embodiment, the Upcoming_Link notification includes a reason code of an event in a portion of the "Options" field 2030. The reason code indicates a reason for which the inference is made that the next connection will occur, Information, such as "pre-authentication has been established", "QoS resource is reserved" and "handoff procedure has started", can be given as the indicated reason. As a scenario, a receiving node can take different actions depending on the type of reason indicated in the "Options" field 2030. Specifically, a QoS establishment unit can perform only the zero resource reservation when the reason code indicates a trigger stating that "power in the interface has increased". When the reason code is "network is informed of handoff start", a full resource reservation is started.

Seventh Embodiment

According to another preferred embodiment, the notification function unit 3020 is mounted using a Media Independent Handover Function (MIHF) defined by IEEE 802.21. The Upcoming_Link notification is defined as a local or remote primitive within an event service of the MIHF structure of the IEEE 802.21.

Eighth Embodiment

According to another preferred embodiment, the handover operation unit 3030 includes processing of an IEEE 802.21 MIH handover command, such as MIH_MN_HO_Commit and MIH_Net_HO_Commit. Reception of either MIH_MN_HO_Commit or MIH_Net_HO_Commit serves as a trigger for transmitting the Upcoming_Link notification, and can be stated as the reason code within the "Options" field 2030.

Ninth Embodiment

According to another preferred embodiment, a receiving node can selectively apply a flow filter as a result of receiving the Upcoming_Link notification. The receiving node is a home agent or a communication partner node of the mobile node. According to a specific embodiment, the home agent receives a notification stating that the interface of the mobile node is down, but a next connection is available. The home agent selects whether to transfer a flow defined to the interface to another interface or temporarily buffer the packet. A scenario in which this is particularly useful is when the mobile node holds a care of address (CoA) in a local mobility management environment. In the scenario, the mobile node changes the PoA, but does not update filter rules (of the data flow). However, instead of marling filter rules that are not suitable for use, the home agent simply ignores related filter rules for a short amount of time. As a result, needless updates to the filter rules and the like can be avoided.

It is clear to a person skilled in the art that the methods of solution described above that involves Upcoming_Link notification clearly differs from currently existing conventional technologies. Update messages and QoS zero reservation type messages including a duration period element, such as the binding update (BU) message used in mobile IP, do not actually include predictive elements. Duration period parameters (such as lifetime) are used to optimize (minimize frequency of the message) the frequency of update (indicating that connection is maintained) messages, such as those described above.

Here, embodiments considered most realistic and preferable are indicated and described. However, a person skilled in the art recognizes that various modifications can be made through design and parameters that do not depart from the scope of the present invention.

Each functional block used in the explanations of each embodiment of the present embodiment, described above, can be realized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed after LSI manufacturing or a reconfigurable processor of which connections and settings of the circuit cells within the LSI can be reconfigured can be used. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The connection status notifying method and the mobile node used by the method of the present invention can infer that a new connection will become usable shortly based on a predetermined action, and can give notification thereof. Therefore, the connection status notifying method and the mobile node used by the method of the present invention can be advantageously used as a connection status notifying method and a mobile node used by the method in which notification is given of a connection status that changes as a result of disconnection from a data network and reconnection to a data network being repeatedly performed.

The invention claimed is:

1. A connection status notifying method of giving notification of information related to an establishment of a connected state between a mobile node and a base station that is a new connection destination of the mobile node, comprising a step of:
   receiving, by the mobile node, information stating that a connection with a base station that is a current connection destination will be broken;
   starting, by the mobile node, a predetermined process with the base station that is the new connection destination; and
   generating, by the mobile node, a predetermined notification message and transmitting the generated notification message when the predetermined process is judged to be completed, the predetermined notification message being used to give notification to a predetermined component part within the mobile node or to another communication device that a connected state is established with the base station of the new connection destination.

2. The connection status notifying method according to claim 1, wherein the predetermined process is at least one of a pre-authentication procedure that is a security association between the mobile node and the base station of the new connection destination, a quality of service resource reservation, and an imminent handover signaling.

3. The connection status notifying method according to claim 2, wherein the imminent handover signaling is mounted using a MIN_MN_MO_Commit primitive of IEEE 802.21 or a MIN_Net_MO_Commit primitive of IEEE 802.21.

4. The connection status notifying method according to claim 1, wherein the predetermined notification message includes message identifying information and identifying information of the mobile node.

5. The connection status notifying method according to claim 4, wherein the predetermined notification message includes at least one of identifying information of the base station of the new connection destination and option information.

6. The connection status notifying method according to claim 5, wherein the option information includes at least one of information on an amount of time until reconnection, and a reason code indicating a reason for which inference is made that a next connection will be made.

7. The connection status notifying method according to claim 6, wherein the reason code includes at least one of a reason code giving performance of a pre-authentication procedure as a reason, a reason code giving performance of a quality-of-service resource reservation as a reason, and a reason code giving start of a handoff procedure as a reason.

8. The connection status notifying method according to claim 1, wherein the other communication device is at least one of a communication partner node of the mobile node, an instant messaging server, an authentication, authorization, and accounting server, and a paging controller.

9. The connection status notifying method according to claim 8, wherein the instant messaging server, the authentication, authorization, and accounting server, and the paging controller send the predetermined notification message to another node.

10. The connection status notifying method according to claim 1, wherein the mobile node has a processing unit that processes the predetermined notification message.

11. The connection status notifying method according to claim 10, wherein the processing unit is mounted using a Media Independent Handover Function of IEEE 802.21.

12. The connection status notifying method according to claim 10, wherein the processing unit includes at least one of a handover function, a security function, and a quality-of-service function.

13. The connection status notifying method according to claim 1, wherein the predetermined notification message is transmitted via a different interface of the mobile node.

14. The connection status notifying method according to claim 1, wherein the predetermined notification message is used for at least one of power management, connection and disconnection management, notification of connection to other nodes, and filter rule management.

15. A mobile node used in a connection status notifying method of giving notification of information related to an establishment of a connected state between the mobile node and a base station that is a new connection destination of the mobile node, the mobile node comprising:
  a receiving means for receiving information stating that a connection with a base station that is a current connection destination will be broken;
  a processing means for starting a predetermined process between the mobile node itself and the base station that is the new connection destination;
  a message generating means for generating a predetermined notification message when the predetermined process is judged to be completed, the predetermined notification massage being used to give notification to a predetermined component part within the mobile node or to another communication device that a connected state is established between the mobile node itself and the base station of the new connection destination; and
  a transmitting means for transmitting the generated predetermined notification message.

16. The mobile node according to claim 15, wherein the predetermined process is at least one of a pre-authentication procedure that is a security association between the mobile node and the base station of the new connection destination, a quality-of-service resource reservation, and an imminent handover signaling.

17. The mobile node according to claim 16, wherein the imminent handover signaling is mounted using a MIN_MN_MO_Commit primitive of IEEE 802.21 or a MIN_Net_MO_Commit primitive of IEEE 802.21.

18. The mobile node according to claim 15, wherein the predetermined notification message includes message identifying information and identifying information of the mobile terminal.

19. The mobile node according to claim 18, wherein the predetermined notification message includes at least one of identifying information of the base station that is the new connection destination and option information.

20. The mobile node according to claim 19, wherein the option information includes at least one of information on an amount of time until reconnection, and a reason code indicating a reason for which inference is made that a next connection will be made.

21. The mobile node according to claim 20, wherein the reason code includes at least one of a reason code giving performance of a pre-authentication procedure as a reason, a reason code giving performance of a quality-of-service resource reservation as a reason, and a reason code giving start of a handoff procedure as a reason.

22. The mobile node according to claim 15, wherein the other communication device is at least one of a communication partner node of the mobile node, an instant messaging server, an authentication, authorization, and accounting server, and a paging controller.

23. The mobile node according to claim 22, wherein the instant messaging server, the authentication, authorization, and accounting server, and the paging controller send the predetermined notification message to another node.

24. The mobile node according to claim 15, wherein the processing means processes the predetermined notification message.

25. The mobile node according to claim 24, wherein the processing means is mounted using a Media Independent Handover Function of IEEE 802.21.

26. The mobile node according to claim 24, wherein the processing means includes at least one of a handover function, a security function, and a quality-of-service function.

27. The mobile node according to claim 15, wherein the predetermined notification message is transmitted via a different interface of the mobile node.

28. The mobile node according to claim 15, wherein the predetermined notification message is used for at least one of power management, connection and disconnection management, notification of connection to other nodes, and filter rule management.

* * * * *